Feb. 6, 1968  G. T. SCHULER  3,367,323

FETAL ELECTROCARDIOGRAPH AND METHOD

Filed March 17, 1965  2 Sheets-Sheet 2

INVENTOR.
GRAHAM T. SCHULER
BY
PATENT AGENT

United States Patent Office 3,367,323
Patented Feb. 6, 1968

3,367,323
FETAL ELECTROCARDIOGRAPH AND METHOD
Graham T. Schuler, Ottawa, Ontario, Canada, assignor to National Research Council, Ottawa, Ontario, Canada, a corporation of Canada
Filed Mar. 17, 1965, Ser. No. 440,404
Claims priority, application Canada, Nov. 17, 1964, 916,635
6 Claims. (Cl. 128—2.06)

ABSTRACT OF THE DISCLOSURE

An electrocardiograph for obtaining an enhanced fetal heart beat signal in the presence of the maternal heartbeat signal wherein the signals obtained from a series of surface electrodes positioned in a ring about the mother's torso at the fundic level are fed to a resistance network from which an output signal is taken that would be the same as the signal from a theoretical depth electrode placed within the maternal body. This signal and a signal obtained from an electrode placed in the pubic area of the mother both taken with reference to a voltage reference point on the resistance network are subtracted algebraically giving an output signal having an increased fetal ECG signal component and a decreased maternal ECG component.

---

This invention relates to a fetal electrocardiograph and more particularly to an additive electrocardiograph capable of indicating an enhanced fetal heart signal in relation to the maternal heart signal and noise.

Fetal electrocardiography using simple surface additional electrodes frequently produces a fetal signal that has a poor signal-to-noise ratio. The fetal signal may be obscured by the much larger maternal heart signal with the result that, on many occasions, the fetal signal is undemonstrable even when the electrode is only a few inches away from a mature living fetus. Techniques that attempt cancellation of the maternal signal present in the plane of the fetal electrodes provide some improvement of the fetal-maternal signal ratio but as the electrodes do not lie on the axis that passes through the maternal and fetal hearts, they can only present for cancellation the small component of the maternal signal that lies in their common plane. Moreover, any technique of simple addition or subtraction of two signals will not usually result in an improved signal-to-noise ratio, for as some noise peaks add, the ratio of fetal signal to randomly occurring noise peaks remains unchanged.

There are many occasions during the pregnancy period, when it would be most useful for the doctor or obstetrician to have a more powerful means of obtaining a fetal heart signal than by the stethoscope or simple ECG methods now used. During normal pregnancy the present devices are generally quite adequate, however, in abnormal cases including cases where the mother has had a history of difficult child-births, or is a diabetic, or is addicted to drugs or alcohol it would be most desirable to have a device that can find a fetal heart signal and give useful information in regards to the fetal heart over extended periods of time. In the case of mothers suffering from diabetes and certain other conditions where it has become the practice to deliver the baby prematurely by Caesarean section, such an apparatus would assist the obstetrician greatly in determining the optimum time to deliver the baby. In addition to the above more direct uses of such a device, it would be a very useful tool in medical research such as the study of the effects on the fetus of certain diseases suffered by the mother or of the effects of tobacco, drugs, alcohol, or certain foods taken by the mother.

It is an object of the present invention to provide an electrocardiograph capable of giving an enhanced fetal heart signal in relation to the maternal heart signal and noise.

It is another object of the invention to provide an electrocardiograph capable of indicating the existence or non-existence of a fetal heart signal to a very high degree of accuracy.

It is another object of the invention to provide an electrocardiograph for fetal heart signals that is relatively simple and convenient to use and that does not require attachment of an electrode to the head or other parts of the body of the fetus in the uterus.

These and other objects of the invention are achieved by providing an additive fetal electrocardiograph wherein a multiplicity of surface electrodes are positioned about the body of the mother preferably in a spaced ring in a plane transverse to the mother's torso at the fundic level or in a pattern on the abdomen, said electrodes being connected via variable resistors to a common point to form a voltage reference position, signals from said electrodes being fed via amplifiers to a two-dimensional resistance network where they are combined electrically to produce a signal that would be produced from a theoretical depth electrode positioned within the body of the mother near the maternal-fetal cardiac axis. This signal and a signal obtained from an electrode placed in the pubic area of the mother both taken with reference to the said voltage reference position are subtracted algebraically to produce an output signal having an increased fetal ECG signal component and a decreased maternal ECG signal component.

In drawings which illustrate embodiments of the invention,

Figure 1:
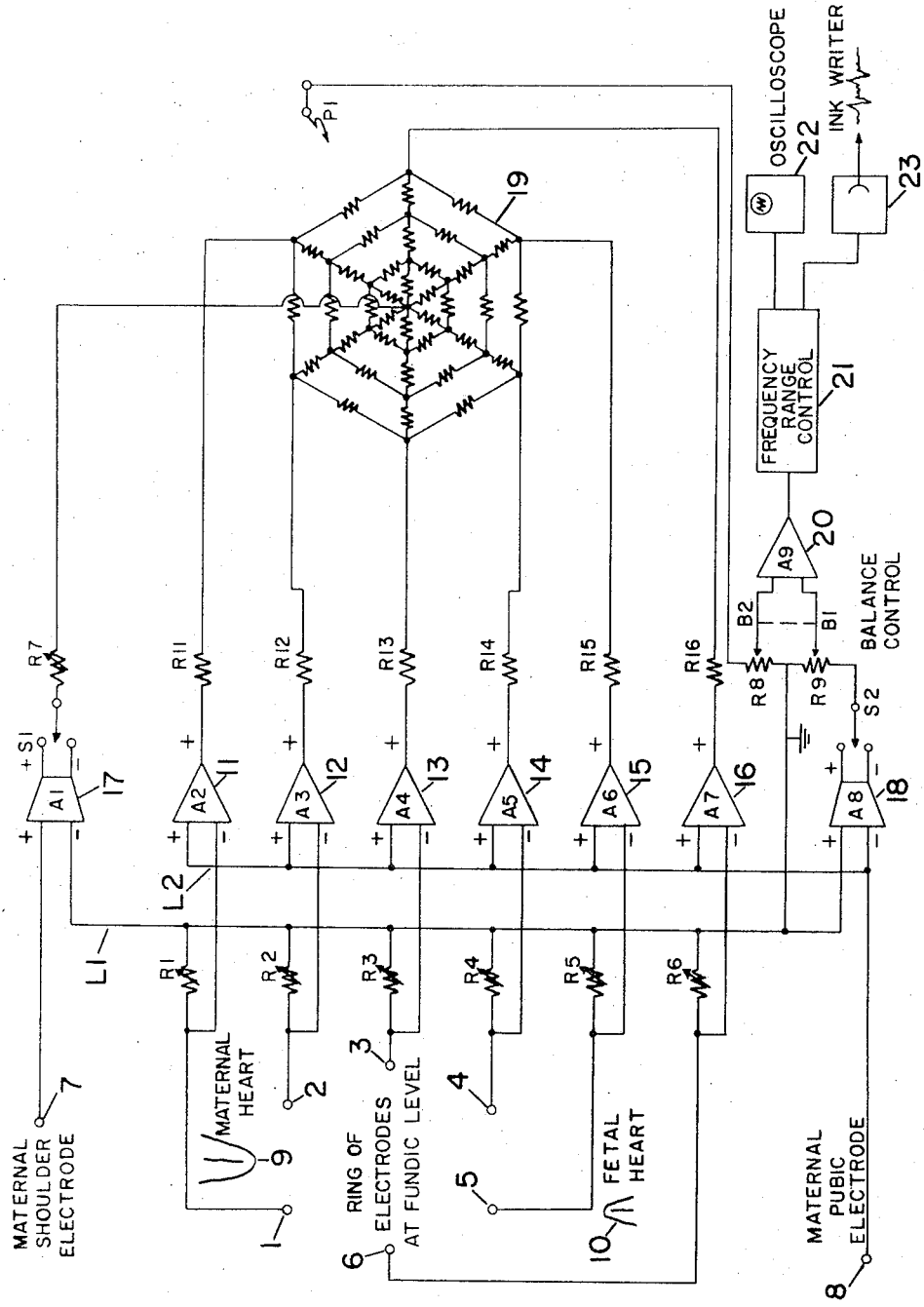
FIGURE 1 is an electrical circuit.

Referring to FIGURE 1, a series of surface electrodes 1, 2, 3, 4, 5, and 6 capable of being positioned at various locations on the surface of the torso of the mother are connected via individual variable resistors R1, R2, R3, R4, R5, and R6 to a common line L1 which is preferably grounded. The signals from the electrodes are amplified in amplifiers A2, A3, A4, A5, A6, and A7 whose inputs are also connected to common line L2 and the amplified signals are applied via resistors R11, R12, R13, R14, R15, and R16 to a resistance network shown generally as 19. This resistance network shown here as a hexagonal web is designed to simulate a two-dimensional resistance device. If more or fewer than six inputs are used, the network could be varied to suit. The number of shunt resistor levels shown here as three would in actual practice be much greater. In an actual working device the number is eleven with many of the resistors being variable. An electric probe P1 capable of making contact with any desired point in the resistance network 19 is connected to one end of two resistors R8 and R9 in series. If desired a composite probe could be used making contact at more than one point.

A surface electrode 8 which in practice would be positioned on the mother's body in the pubic area is connected to line L2 and amplifier A8. An input from line L1 is also applied to amplifier A8. The output from amplifier A8 is connected via a polarity reversing switch S2 to the other end of the two series resistors R8 and R9. The mid-point between resistors R8 and R9 is connected to line L1. An output is taken from series resistors R8 and R9 by means of ganged sliders B1 and B2 and this is applied via amplifier A9 and frequency range control 21 either to an oscilloscope 22 or a standard ECG ink writer 23.

An additional surface electrode 7 which would be placed at some position on the mother's shoulder area is connected to an amplifier A1 which also has an input connection to line L1. The output from the amplifier is applied via a polarity reversing switch S1 and a variable resistor R7 to an intermediate point of resistance network 19. In many cases the signal from electrode 7 may not be necessary and its effect can be modified to a large extent by adjusting variable resistor R7.

In operation, the electrocardiograph of FIGURE 1 is connected to the patient with electrodes 1 to 6 positioned in a transverse plane around the torso at the fundic (upper end of the uterus) level or in a pattern on one surface of the body. Electrode 8 is positioned at a convenient spot in the mother's pubic area. Electrode 7 is positioned on the mother's shoulder area. The operator of the device adjusts resistors R1 to R6 to give a maximum fetal signal at point (slider) B1. An oscilloscope would be connected to this point directly to obtain this. It should be pointed out that the effect of resistors R1 to R6 is to give a reference voltage position which might be considered to be within the patient's body. (No part of the patient's body is grounded.) Reversing switches S1 and S2 and variable resistance R7 are adjusted in conjunction with probe P1 which is moved about on resistance network 19 until (1) an inverted fetal signal is obtained at point B2 similar (but inverted) to that found at B1 and (2) a maternal signal is found at B2 similar to that found at B1. After this adjustment has been made, the balance control (sliders B1 and B2) are adjusted to increase the fetal signal and decrease the maternal signal. An enhanced fetal ECG record is then obtained on ink writer 23 or oscilloscope 22 in which the maternal heart signal has been almost completely cancelled.

Figure 2:
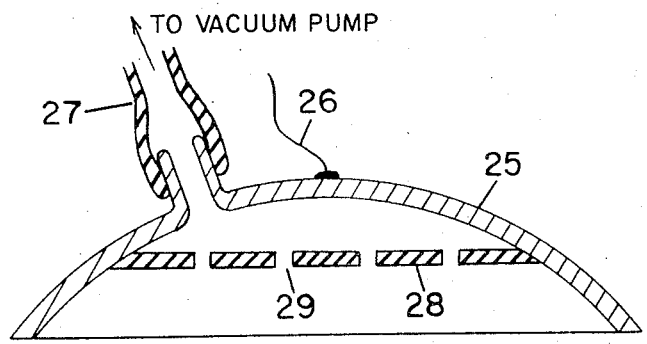
FIGURE 2 is a cross-section of an electrode that may be used with the invention.

FIGURE 2 shows in cross-section a form of electrode that may be used with this device. It consists of a metal cup 25 which would be placed on the body at the desired location and held in position by vacuum provided by tube 27 connected to a pump. An internal web 28 with openings 29 prevents the skin from being sucked up the vacuum line opening. An electrical lead 26 carries the signal from the cup to the main ECG circuitry. The contacting parts of the cups are covered with a commercially available low resistance paste before being applied to the skin.

Figure 3:
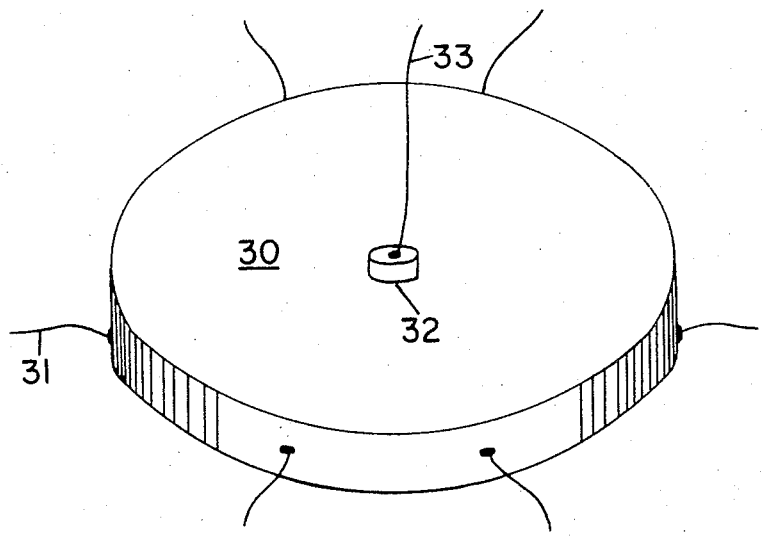
FIGURE 3 is an alternative resistance device for the resistance network shown in FIGURE 1.

FIGURE 3 shows in somewhat schematic fashion an alternative two-dimensional resistance device to the resistance network 19 of FIGURE 1. A solid disc 30 made of resistive material e.g. carbon has a series of ohmic connectors 31 spaced around the periphery thereof. These would be connected to the amplifiers A2 to A7 of FIGURE 1 in a similar fashion to the network 19. A contactor 32 connected to lead 33 is capable of being moved over the surface of the block to make a similar type of adjustment as probe P1 of FIGURE 1.

Figure 4:
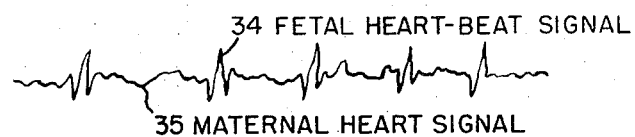
FIGURE 4 is a typical fetal ECG output with the maternal component almost completely cancelled out.

FIGURE 4 shows a representative fetal ECG output wherein the maternal heart signal has been completely cancelled. The fetal heart-beat signal is shown at 34 and the maternal heart signal, which is difficult to locate is shown at 35.

The theoretical consideration behind the operation of the device i.e. the obtaining of two signals near an axis that passes through the maternal heart and fetal heart, adjusting these until they have the same amplitude of maternal signal and then subtracting to cancel the maternal ECG pattern configurations whereas the two fetal signals obtained are of nearly similar amplitude but of opposite polarity and when subtracted (algebraically) give an enhanced fetal signal, are technically correct. However, as heart muscle generates voltage in different places at different times, no single electrical fetal-maternal cardiac axis exists, and as electrical homogeneity is reduced by preferential conduction paths, the perfection forecast by the theory is difficult to achieve. The device is designed to operate in an electrically noisy hospital room and operated by nurses using commercial adhesive electrodes and a paste that gives a 50 kilohm contact. In spite of these operational difficulties the device has been tested under hospital conditions on a large number of cases. In a total of 250 assessments of fetal life made after 12 gestational weeks, the apparatus has provided only one false negative report and no false positive reports.

It has been found that in some cases the device will operate with useful output with the electrodes not positioned in a ring about the torso of the patient but in a cluster on one side of the body. This is somewhat counter to the theory of the device but possibly because of the homogeneity of the electric fields in the body and the intrusion of strong outside electrical fields, a theoretical or virtual electrode position inside the body is still obtained.

It might be considered that the device would be difficult to operate in view of the considerable adjustment that has to be made. It has been found, however, that the apparatus can be quickly and efficiently operated by hospital nursing staff after only a short training period.

Representative types and values for the various circuit components are as follows:

Amplifiers A1–A8—Textronic #122; Frequency range, .8–1000 c.p.s.
Amplifier A9—Conventional differential amplifier
Resistors R1–R6—20,000 ohms
Resistor R7—100,000 ohms
Resistors R11–R16—20,000 ohms
Resistors R8 and R9—500,000 ohms The resistors of network 19 may be of any convenient value as their absolute values are not important. The frequency range control (21 of FIGURE 1) is provided to give better control of the high and low frequency components of the ECG signal.

What is claimed is:
1. A fetal electrocardiograph comprising:
 (a) a multiplicity of electrodes adaptable for positioning in a pattern on the surface of the maternal body,
 (b) connections from said electrodes via variable resistors to a common point, said common point forming a voltage reference position,
 (c) amplifier means to amplify the signals obtained from each of said electrodes,
 (d) a two-dimensional resistance device,
 (e) connections from said amplifier means to said resistance device,
 (f) adjustable probe means in conjunction with said resistance device to provide a single signal output representing the signal obtainable from a theoretical electrode inside the maternal body between the fetal heart and the maternal heart,
 (g) an electrode positionable in the maternal pubic area,
 (h) amplifier means to amplify the signal obtained from said electrode positioned in the maternal pubic area, and
 (i) electrical subtraction means for subtracting algebraically the signal from the said resistance device and the signal from the said electrode positioned in the maternal pubic area both taken with reference to the said voltage reference position to provide an output containing an enhanced fetal heart signal and a diminished maternal heart signal.

2. A fetal electrocardiograph as in claim 1 wherein the two-dimensional resistance device is a network of resistors.

3. A fetal electrocardiograph as in claim 1 wherein the two-dimensional resistance device is a disc-shaped structure of solid resistance material.

4. A fetal electrocardiograph comprising:
(a) a multiplicity of electrodes adaptable for positioning about the maternal body substantially in a plane transverse to the torso at the fundic level,
(b) connections from said electrodes via variable resistors to a common point such that a theoretical depth electrode within the maternal body is produced giving a voltage reference position,
(c) amplifier means to amplify the signals obtained from each of said electrodes,
(d) a two-dimensional resistance device,
(e) connections from said amplifier means to said resistance device,
(f) adjustable probe means in conjunction with said resistance device to provide a single signal output representing the signal obtainable from a theoretical electrode inside the maternal body between the fetal heart and the maternal heart,
(g) an electrode positionable in the maternal pubic area,
(h) amplifier means to amplify the signal obtained from said electrode positioned in the maternal pubic area, and
(i) electrical subtraction means for subtracting algebraically the signal from the said resistance device and the signal from the said electrode positioned in the maternal pubic area taken with reference to the said voltage reference position to provide an output containing an enhanced fetal heart signal and a diminished maternal heart signal.

5. A method of obtaining an enhanced fetal electrocardiograph signal in the presence of the stronger maternal heart signal and noise comprising:
(a) placing a series of electrodes on the surface of the maternal body in a predetermined pattern,
(b) obtaining a voltage reference position by connecting said electrodes to a common point via variable resistors,
(c) obtaining signals from said electrodes,
(d) amplifying said signals,
(e) obtaining from said amplified signals a single signal that would be obtained from a theoretical electrode positioned with the maternal body near the maternal-fetal heart axis,
(f) placing a further electrode in the maternal pubic area,
(g) obtaining a signal from said further electrode, and
(h) electrically subtracting the said single signal and the said signal from said further electrode both taken with reference to the said voltage reference position to obtain an output having an increased fetal signal and a decreased maternal signal.

6. A method of obtaining an enhanced fetal electrocardiograph as in claim 5 wherein the electrodes are placed about the maternal body substantially in a plane transverse to the torso at the fundic level.

References Cited

UNITED STATES PATENTS

| | | | |
|---|---|---|---|
| 3,030,946 | 4/1962 | Richards | 128—2.06 |
| 3,171,892 | 3/1965 | Pantle | 179—1 |
| 3,187,098 | 6/1965 | Farrar et al. | 179—1 |

OTHER REFERENCES

Hon, "Fetal Heart Rate," pp. 772–784, Am. J. Obst. and Gynec., July 15, 1963.

Buxton, "Fetal Electrocardiography," pp. 441–444, JAMA, Aug. 10, 1963.

RICHARD A. GAUDET, *Primary Examiner.*

SIMON BRODER, *Examiner.*